United States Patent [19]

Bourdoncle et al.

[11] Patent Number: 5,840,227
[45] Date of Patent: Nov. 24, 1998

[54] METHOD OF MAKING INTERNAL THERMAL PROTECTION FOR A THRUSTER

[75] Inventors: Jacques Bourdoncle, Saint Aubin de Medoc; Loïc Le Magourou, Saint Medard en Jalles, both of France

[73] Assignee: Societe Europeenne de Propulsion, Suresnes, France

[21] Appl. No.: 801,015

[22] Filed: Feb. 19, 1997

[30] Foreign Application Priority Data

Feb. 20, 1996 [FR] France .................................. 96 02051

[51] Int. Cl.⁶ .................................................. B29C 70/00
[52] U.S. Cl. .......................... 264/112; 264/135; 264/267; 264/269
[58] Field of Search .................... 264/135, 269, 264/112, 267

[56] References Cited

U.S. PATENT DOCUMENTS

| | | | |
|---|---|---|---|
| 4,501,771 | 2/1985 | Long | 427/176 |
| 4,833,191 | 5/1989 | Bushway et al. | 524/473 |
| 4,942,214 | 7/1990 | Sakhpara | 528/59 |

FOREIGN PATENT DOCUMENTS

| | | |
|---|---|---|
| 55-005944 | 1/1980 | Japan . |
| 62-060617 | 3/1987 | Japan . |

*Primary Examiner*—Jan H. Silbaugh
*Assistant Examiner*—Edmund H. Lee
*Attorney, Agent, or Firm*—Weingarten, Schurgin, Gagnebin & Hayes LLP

[57] ABSTRACT

Internal thermal protection for a thruster structure, e.g. an end wall and extender structure of a tactical thruster, is made by preparing a low viscosity elastomer base suitable for being mixed with fibers by means of a mechanical mixer without putting the base into solution, by mixing the elastomer base and the fibers so as to obtain a solid composition in finely divided form suitable for being stored, and by molding the composition in situ in order to obtain the thermal protection directly on the structure to be protected. The viscosity of the elastomer base is less than 1500 Pa.s at 50° C., and it vulcanizes at a temperature greater than 120° C.

4 Claims, 2 Drawing Sheets

METHOD OF MAKING INTERNAL THERMAL PROTECTION FOR A THRUSTER

The invention relates to making internal thermal protection having high resistance to ablation for use in thrusters. A particular field of application for the invention is that of internal thermal protection for the end wall and extender structures of thrusters for tactical missiles. Nevertheless, the invention can be used with other thruster structures, e.g. for internal thermal protection for the end walls of large thrusters.

BACKGROUND OF THE INVENTION

The solid fuel thrusters of tactical missiles are generally constituted by the following:
- a thruster body enclosing the propellant;
- an end wall and extender structure comprising an end wall portion closing the body of the thruster at its rear end and an extender portion extending the end wall; and
- a nozzle fixed to the end of the extender.

The extender is generally cylindrical, having a diameter that is considerably smaller than the diameter of the thruster body, for the purpose of making it possible to provide a space around the extender for receiving equipment without increasing overall size beyond the diameter of the body of the thruster.

The end wall extender structure is usually a metal structure provided with internal thermal protection.

It is necessary for the internal thermal protection to have high resistance to the ablation caused by the combustion gases from the propellant travelling at very high speed towards the nozzle when the thruster is in operation.

Given the temperature of the combustion gases, it is also necessary for the thermal protection to have good insulation capacity so as to make it possible throughout operation to limit the temperature of the metal structure to a level that is compatible with its structural function, and to limit the temperature outside the metal structure to a level compatible with proper operation of the adjacent equipment.

It is also highly desirable for the material of the thermal protection to have high capacity for deformation, enabling it to follow the deformation of the metal structure without breaking and without separating from the metal structure. The metal structure will deform significantly under the effect, in particular, of the pressure of the combustion gases. If the material of the thermal protection does not have sufficient capacity for deformation, then either the structure needs to be thicker, or else the architecture needs to be made more complicated, giving rise to a weight penalty and to a cost penalty, overall.

In order to satisfy these conditions, it is known that thermal protection can be made out of composite material, in particular of the cloth and phenol resin type. The cloth which constitutes the reinforcement of the composite material may be made of carbon fibers, for example, or when the combustion gases of the propellant are highly oxidizing, out of fibers that withstand oxidation, e.g. silica fibers. Manufacture of the thermal protection includes steps of impregnating the cloth with phenol resin, cutting the impregnated cloth into strips, winding the strips diagonally over a former, baking, machining the thermal protection to the desired dimensions, and sticking it to the inside wall of the structure to be protected.

The costs of the raw materials and of the various operations, which are difficult to automate in their entirety, make the above solution very expensive.

Another known solution, that is cheaper, consists in making the thermal protection out of elastomer-based materials reinforced with fibers, e.g. and depending on the nature of the propellant, carbon fibers or fibers that withstand oxidation such as silica fibers. The thermal protection is made from a composition comprising an elastomer base of elastomer gum having relatively high viscosity that is mixed with fibers by means of a conventional mixer as is used in the rubber industry, making a sheet, e.g. by passing the composition between rollers, cutting the sheet, placing the cutout layers in a mold, molding the internal thermal protection under high pressure, given the high viscosity of the mixture, and sticking the thermal protection on the structure to be protected. Such a method is described in document FR-A-2 144 071 in the name of the Applicant. The high viscosity of the elastomer base makes it possible to draw it into sheet form, but also makes it difficult to mix it with the fibers without breaking the fibers. With this mixture, it can even be preferable to put the elastomer base into solution, thereby requiring additional subsequent steps of eliminating the solvent and drying.

In spite of its relatively large number of steps, that solution is less expensive than the first. Because it uses an elastomer base, it also offers greater capacity for deformation. Nevertheless, both known solutions suffer from the drawback of not guaranteeing absolutely reliable adhesion to the inside wall of the structure to be protected. This applies in particular to the extender portion when the structure is an end wall and extender structure, since it is very difficult to stick a cylinder on a cylinder. Unfortunately, reliable adhesion is necessary if the thruster is to operate properly, even after a prolonged period of storage.

OBJECTS AND SUMMARY OF THE INVENTION

Thus, an object of the present invention is to provide a method of making internal thermal protection that provides a better guarantee of reliable adhesion to the wall of the structure to be protected.

Compared with the state of the art, another object of the invention is to reduce the cost of manufacturing and implementing such internal thermal protection.

These objects are achieved by a method of making internal thermal protection for a thruster structure, the method comprising making an elastomer base and mixing it with fibers in order to obtain thermal protection in the form of a fiber-reinforced elastomer layer, the method comprising the following steps:
- preparing an elastomer base having viscosity of less than 1500 Pa.s at 50° C., essentially constituted by a substance selected from polychloroprenes and silicone gums that vulcanize at a temperature above 120° C.;
- mixing the elastomer base and the fibers by means of a mechanical mixer without putting the base into solution, so as to obtain a solid composition in divided form that is suitable for storage; and
- molding the composition in situ in order to obtain the thermal protection directly on the structure to be protected.

The use of a low viscosity elastomer base provides several significant advantages.

Firstly, that makes it possible to perform the mixing with the fibers by means of a mechanical mixer, e.g. an internal mixer as is conventional in the rubber industry, without damaging the fibers, such that there is no longer any need to put the elastomer base into solution.

Secondly, the low viscosity of the elastomer base, although unsuitable for providing sheets that can be draped over a former, as in the prior art, nevertheless makes it easy to perform in-situ molding of the thermal protection, in particular by placing the composition in the divided state between the structure to be protected and at least one complementary mold element, with the composition then being compressed at a low pressure compatible with the elastic limit of the metal of the structure and vulcanized in situ. The thermal protection is simultaneously vulcanized and bonded to the structure in the last step.

Another advantage of the method lies in the fact that by using an elastomer base that vulcanizes at high temperature, i.e. above 120° C., it is possible to store the composition formed by mixing the elastomer base and the fibers over relatively long periods before using it. In this respect, this composition differs from those described in documents U.S. Pat. No. 4,076,684 and U.S. Pat. No. 4,108,940 which are suitable for use over a very short duration only since they vulcanize at ambient temperature, and they are intended for applications quite different from providing thermal protection for thrusters.

An additional advantage of the method consists in the smaller number of operations compared with prior art methods.

In addition, molding the thermal protection in situ makes it possible to ensure better adhesion with the structure to be protected. In this respect, the surface of the structure to be protected can be treated with a bonding agent before molding the thermal protection. It is also possible to include the bonding agent in the elastomer base composition, as is known per se from document EP-0 659 860 for elastomer matrices that are to adhere to substrates.

BRIEF DESCRIPTION OF THE DRAWINGS

A particular implementation of a method of the invention is described below by way of non-limiting indication, with reference to the accompanying drawings, in which.

MORE DETAILED DESCRIPTION

Figure 1:
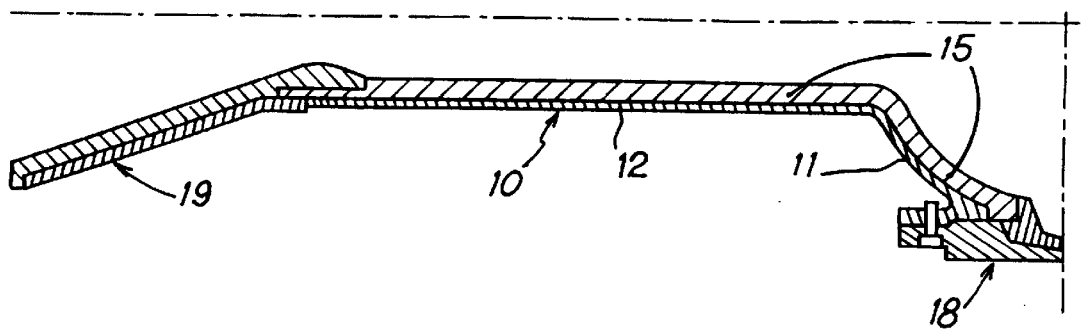
FIG. 1 is a diagrammatic axial half-section of a rear assembly for a tactical thruster, having an end wall and extender structure provided with internal thermal protection.

In FIG. 1, references 11 and 12 designate respectively the end wall portion and the extender portion of a metal end wall and extender structure 10 disposed between a thruster body 18 containing solid propellant and a nozzle 19 for ejecting the combustion gases produced by the propellant.

By way of example, the thruster may be a solid propellant tactical thruster. As shown in FIG. 1, the end wall 11 closes the rear portion of the thruster body 18, while the extender 12 extends the end wall and connects it to the nozzle 19.

The outside diameter of the extender 12 is considerably smaller than that of the thruster body, thereby making it possible to house various items of equipment (not shown) in the space around the extender 12 without projecting beyond the outside diameter of the thruster body.

Thermal protection 15 is stuck to the inside wall of the end wall and extender metal structure 11-12. The purpose of the thermal protection is to thermally insulate the metal structure and the space surrounding it from the combustion gases produced by the propellant while it is in operation, in order to ensure that the structural function of the end wall and extender structure and the operation of the equipment situated around the extender are not affected.

The thermal protection 15 must have high resistance to being ablated by the combustion gases which are ejected at high speed in operation. The thermal protection 15 must also have good capacity for deformation in order to follow dimensional variations, in particular of thermal origin, in the metal structure without breaking and without coming unstuck.

For these reasons, the thermal protection 15 is implemented in this case as a fiber-reinforced elastomer.

A way of making thermal protection as shown in FIG. 1 is described below with reference to FIGS. 2A to 2H.

A first step consists in making an elastomer base. According to a characteristic of the present invention, the elastomer base is selected so as to present low, and even very low, viscosity so that in a manner described below it can subsequently be mixed with fibers by mechanical means without resorting to dissolving the elastomer base and without damaging the fibers. The viscosity is selected to be less than 1500 Pa.s at 50° C. In addition, an elastomer base is selected which vulcanizes at high temperature, i.e. at higher than 120° C.

When the propellant includes a filler based on aluminum powder, the elastomer base preferably comprises essentially a low viscosity polychloroprene gum, e.g. that sold under the name "Neopreme FB" by the American company DuPont de Nemours. Various components can be added to the gum, and in particular:

a resin such as a phenol resin for the purpose of favoring the formation of a carbon-containing residue while the thermal protection is being pyrolyzed under the action of the combustion gases;

a plasticiser having the function of reducing the viscosity of the mixture while it is being prepared and of improving the mechanical behavior of the thermal protection at the low temperatures at which the thruster is stored; the plasticiser is preferably selected from ester plasticisers;

carbon black, or other equivalent reinforcing filler, having the purpose of improving the mechanical characteristics of the thermal protection;

a conventional vulcanizing system, e.g. constituted by an association of magnesium oxide, zinc oxide, and stearic acid; and fibers, e.g. carbon fibers (from a rayon precursor or a polyacrylonitrile precursor or an isotropic tar precursor) having the purpose of mechanically reinforcing the carbon residue that forms during pyrolysis of the thermal protection under the action of the combustion gases.

When the propellant generates highly oxidizing gases during combustion (in particular a propellant that does not include aluminum powder in its formulation), the elastomer base may be constituted essentially either by a low viscosity polychloroprene gum as above, or else by a low viscosity silicone gum, e.g. that sold under the name RP 706 by the French company Rhône Poulenc.

In the first case, various components can be added to the polychloroprene gum, and in particular;

a resin such as a phenol resin for the purpose of favoring the formation of a carbon-containing residue while the thermal protection is being pyrolyzed under the action of the combustion gases;

a plasticiser having the function of reducing the viscosity of the mixture while it is being prepared and of improving the mechanical behavior of the thermal protection at the low temperatures of storage; the plasticiser is preferably selected from ester plasticisers;

carbon black, or other equivalent reinforcing filler, having the purpose of improving the mechanical characteristics of the thermal protection;

a conventional vulcanizing system, e.g. constituted by an association of magnesium oxide, zinc oxide, and stearic acid; and inorganic fibers, e.g. of silica or of quartz, having the purpose of mechanically reinforcing the carbon-containing residue that forms during pyrolysis of the thermal protection under the action of the combustion gases.

In the second case, various components may be added to the low viscosity silicone gum, and in particular:

a reinforcing filler based on silica powder and having the purpose of improving the mechanical characteristics of the thermal protection;

a vulcanizing agent, e.g. based on peroxide;

fibers, e.g. carbon fibers (from a rayon precursor or a polyacrylonitrile precursor or an isotropic tar precursor) having the purpose of mechanically reinforcing the residue that forms during pyrolysis of the thermal protection under the action of the combustion gases, and preferably reacting with the silica that comes from the high temperature pyrolysis of the silicone gum to form silicon carbide that withstands oxidation; and a bonding promoter, e.g. based on diacrylate, or on zinc dimethacrylate, enabling the thermal protection to bond directly on the metal structure during the vulcanization operation without it being necessary previously to deposit a special bonding agent thereon.

Figure 2A:
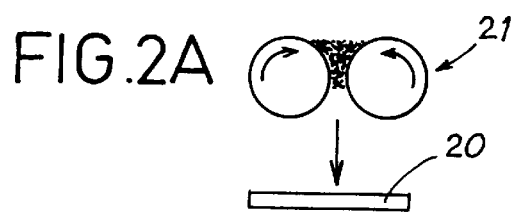
FIGS. 2A to 2H are diagrams showing various successive steps in making thermal protection of the type shown in FIG. 1 using a method of the present invention.
Figure 2B:
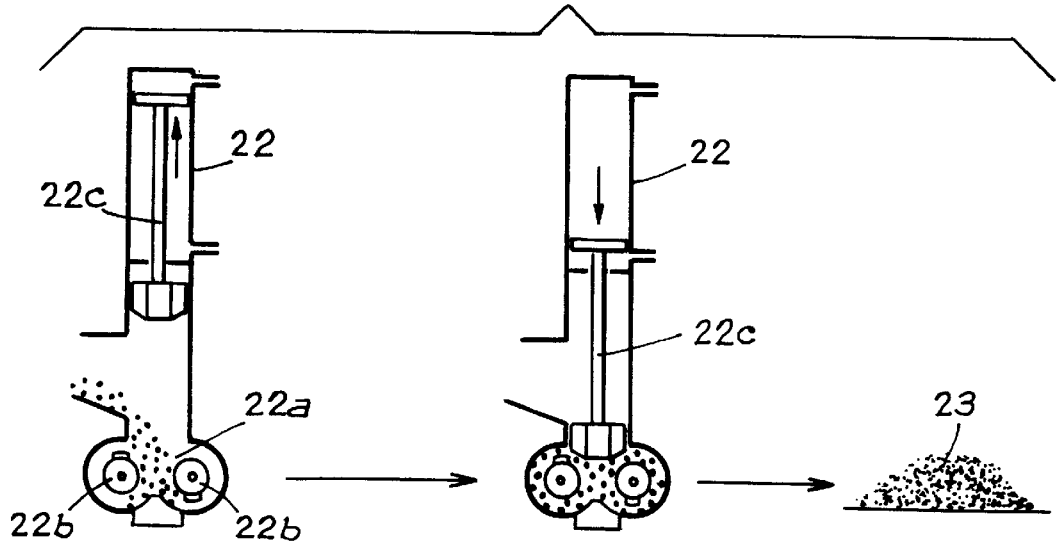
Figure 2C:
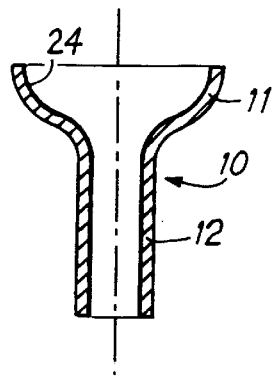

The elastomer base is prepared by a dry method causing its various components to pass through a conventional open mill type mixer 21 (FIG. 2A). An elastomer base 20 is then obtained which can be stored but which is of a viscosity that is too low to enable it to be calendared to form a sheet.

The viscosity of the elastomer base makes it possible to incorporate fibers therein mechanically, e.g. by means of an internal mixer 22 of a type commonly used in the rubber industry. In such a mixer, the ingredients are inserted into a mixing chamber 22a and they are mixed by being passed between two helical blades 22b under pressure exerted by a piston 22c.

A solid composition 23 is then obtained in divided form that is almost in powder form, and that can be stored in that state over periods that are relatively long, e.g. as many as several tens of days, since the elastomer base vulcanizes at high temperature.

The added fibers are refractory fibers capable of withstanding the temperature of the combustion gases when the thruster is in operation. Carbon fibers can be selected if the combustion gases produced by the propellant do not have too great an oxidizing power, otherwise ceramics fibers can be selected, e.g. refractory oxide fibers such as silica fibers.

The fibers added are relatively short, preferably being less than 6 mm long, such that the composition 23 remains in quite finely divided form.

The quantity of fibers added to the elastomer base is selected so that the percentage by weight of fibers in the composition 23 lies in the range 30% to 70%, and preferably in the range 40% to 50% so as to provide satisfactory reinforcement for the thermal protection without spoiling its capacity for deformation.

For the purpose of in-situ molding of the thermal protection in the end wall and extended structure 10, the inside wall thereof may be coated in a bonding agent 24 (FIG. 2C), in particular when using a formulation based on polychloroprene gum. Such bonding agents are well known in the rubber industry. In particular, it is possible to use a product sold under the generic reference "Chemosil" by the German company Henkel, or a product sold under the generic reference "Megum" by the German company Metallgesellschaft. In a variant, it is possible with formulations based on polychloroprene gum to incorporate a bonding promoter in the elastomer base composition so as to avoid the need to use the above-mentioned bonding agent.

For formulations based on silicone gum, the bonding promoter is generally included in the formulation, as mentioned above.

Figure 2D:
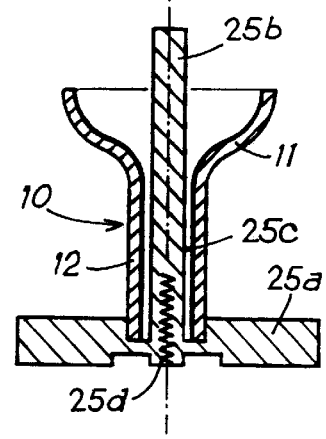

Thereafter, the end wall and extender structure 10 is placed in a metal mold structure comprising a support 25a on which the end of the extender 12 rests, and a central core 25b that leaves an annular gap 25c between itself and the extender 12 with the width of the gap corresponding to the thickness of the thermal protection that is to be made (FIG. 2D).

Figure 2E:
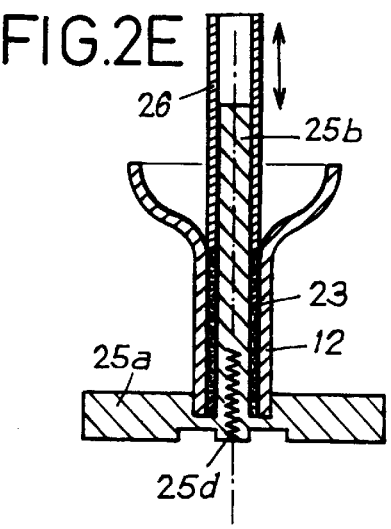

The annular gap 25c is filled with the composition 23 which is compacted by means of an annular tool 26 engaged on the core 25b (FIG. 2E). In order to facilitate compacting, mold elements 25a and 25b can be preheated to a temperature that is well below the vulcanization temperature of the elastomer, e.g. about 80° C. The preheating may be performed by electrically powering resistance elements 25d embedded in the mold elements.

Figure 2F:
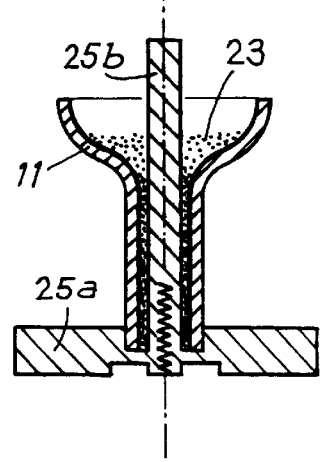
Figure 2G:
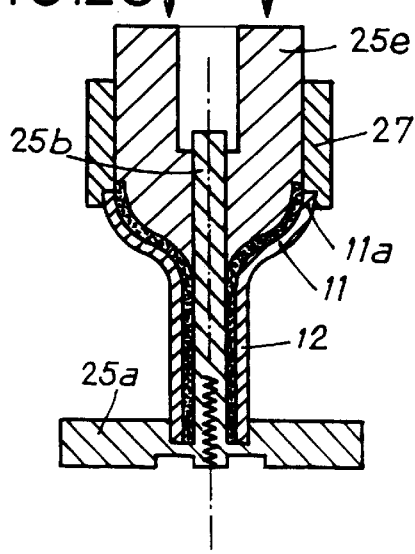

After compacting in the annular space 25c, the end wall 11 is prefilled with a volume of composition 23 that corresponds to the quantity needed to form the internal thermal protection for the bottom (FIG. 2F).

The composition inserted into the bottom 11 is compressed and shaped by means of an additional metal mold element 25e engaged on the central core 25b (FIG. 2G), with compacting being performed by means of a press whose plates are pressed against the support 25a and the mold element 25e. A metal ring 27 may be mounted on the end portion 11a of the bottom remote from the extender 12 to serve as a guide for mold element 25e.

Vulcanization is performed either by heating the mold elements to the necessary temperature (generally about 130° C. to 150° C.) or by putting the assembly in an oven, with the composition 23 being maintained at a pressure of about 5 kPa to 8 kPa.

Figure 2H:
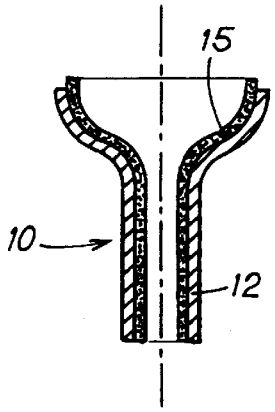

After unmolding, an end wall and extender assembly 10 is obtained that is provided with its internal thermal protection 15 (FIG. 2H).

Although the example given above concerns making internal thermal protection for the end wall and extender structure of a tactical thruster, the method of the invention can be used for forming thermal protection on the surfaces of various thruster structures, and in particular on the end wall surfaces of large solid fuel thrusters.

We claim:

1. A method of making internal thermal protection for a thruster structure, comprising the following steps:

preparing an elastomer base having a viscosity of less than 1500 Pa.s at 50° C., and consisting essentially of a substance that vulcanizes at a temperature above 120° C. and is selected from the group consisting of polychloroprenes and silicone gums;

mixing the elastomer base with fibers by means of a mechanical mixer without putting the base into solution, so as to obtain a solid composition in divided form that is suitable for storage; and molding the solid composition in situ directly on the thruster structure to be protected, including vulcanizing the molded solid composition at a temperature above 120° C., in order to form the a fiber-reinforced elastomer layer directly on the thruster structure to be protected, said layer providing said internal thermal protection for said thruster structure.

2. A method according to claim 1, wherein the molding is performed by placing the solid composition in divided form between the structure to be protected and at least one complementary mold element, compressing the composition and vulcanizing the composition in situ.

3. A method according to claim 1, wherein, prior to molding, the structure to be protected is coated with a bonding agent.

4. A method according to claim 1, wherein a promoter of bonding between the solid composition and the structure to be protected is incorporated in the elastomer base, such that the solid composition can be molded in situ without coating the structure to be protected with a bonding agent.

* * * * *